United States Patent [19]
Bettman

[11] Patent Number: 5,973,832
[45] Date of Patent: Oct. 26, 1999

[54] HIGH PERFORMANCE OPTICAL CIRCULATORS

[75] Inventor: Ralph Bradford Bettman, Mountain View, Calif.

[73] Assignee: Uniphase Corporation, San Jose, Calif.

[21] Appl. No.: 09/175,117

[22] Filed: Oct. 19, 1998

[51] Int. Cl.[6] .................................................. G02B 5/30
[52] U.S. Cl. .................... 359/484; 359/495; 359/497; 359/282; 372/703; 385/11
[58] Field of Search ..................... 359/484, 495, 359/497, 281, 282; 372/703; 385/11, 24, 28, 131

[56] References Cited

U.S. PATENT DOCUMENTS

| | | |
|---|---|---|
| 4,178,073 | 12/1979 | Uchida et al. . |
| 4,461,543 | 7/1984 | McMahon . |
| 4,974,944 | 12/1990 | Chang . |
| 5,204,771 | 4/1993 | Koga . |
| 5,317,655 | 5/1994 | Pan . |
| 5,345,329 | 9/1994 | Shirai et al. . |
| 5,400,418 | 3/1995 | Pearson et al. . |
| 5,408,491 | 4/1995 | Hirai et al. . |
| 5,428,477 | 6/1995 | Siroki . |
| 5,446,578 | 8/1995 | Chang et al. . |
| 5,471,340 | 11/1995 | Cheng et al. ........................... 359/484 |
| 5,574,596 | 11/1996 | Cheng . |
| 5,581,640 | 12/1996 | Pan et al. ................................ 385/11 |
| 5,588,078 | 12/1996 | Cheng et al. ........................... 372/703 |
| 5,606,439 | 2/1997 | Wu . |
| 5,734,763 | 3/1998 | Chang . |
| 5,768,015 | 6/1998 | Pattie ....................................... 385/11 |
| 5,835,270 | 11/1998 | Urino et al. ............................ 359/484 |

FOREIGN PATENT DOCUMENTS

| | | |
|---|---|---|
| 4-264515 | 9/1992 | Japan . |
| 5-215990 | 8/1993 | Japan . |
| 10-20250 | 1/1998 | Japan . |
| Wo 97/22034 | 6/1997 | WIPO . |

*Primary Examiner*—Ricky D. Shafer
*Attorney, Agent, or Firm*—Mike Pritzkau; Stephen C. Shear

[57] ABSTRACT

As will be described in more detail hereinafter, there are disclosed herein high performance optical circulators and an associated method. The improvement in these circulators comprises an arrangement along the length of the main body for performing a predetermined sequence of optical operations including at least three non-reciprocal polarization rotation steps which are separated from one another by other optical operations (a) on a first light signal as the first light signal passes in a forward direction from a first port to a second port and (b) on a second light signal as the second light signal passes in a rearward direction from the second port to a third port such that a substantial portion of the first light signal exits from the second port and a substantial portion of the second light signal exits from the third port and so that the first and third ports are physically isolated with respect to one another at the first end. In one aspect of the invention, an arrangement is provided which receives a first predetermined spatial arrangement of polarization signals of the first light signal and which receives the second light signal to, thereafter, provide a second predetermined spatial arrangement of polarization components of the second light signal. The arrangement is configured for performing a predetermined sequence of alternating walk-off and polarization rotation steps along its length including the aforementioned three non-reciprocal polarization rotations on the first and second light signals.

11 Claims, 4 Drawing Sheets

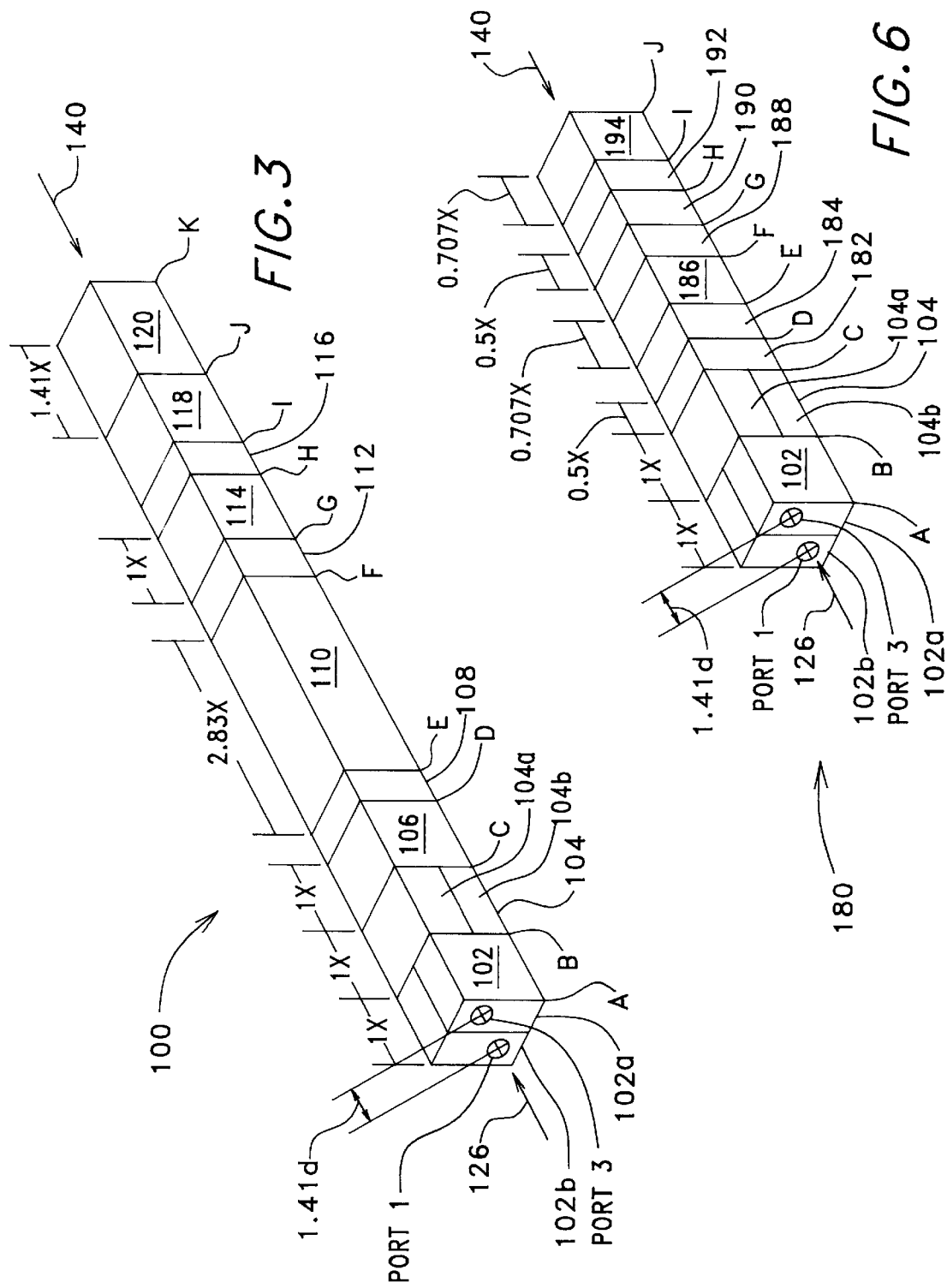

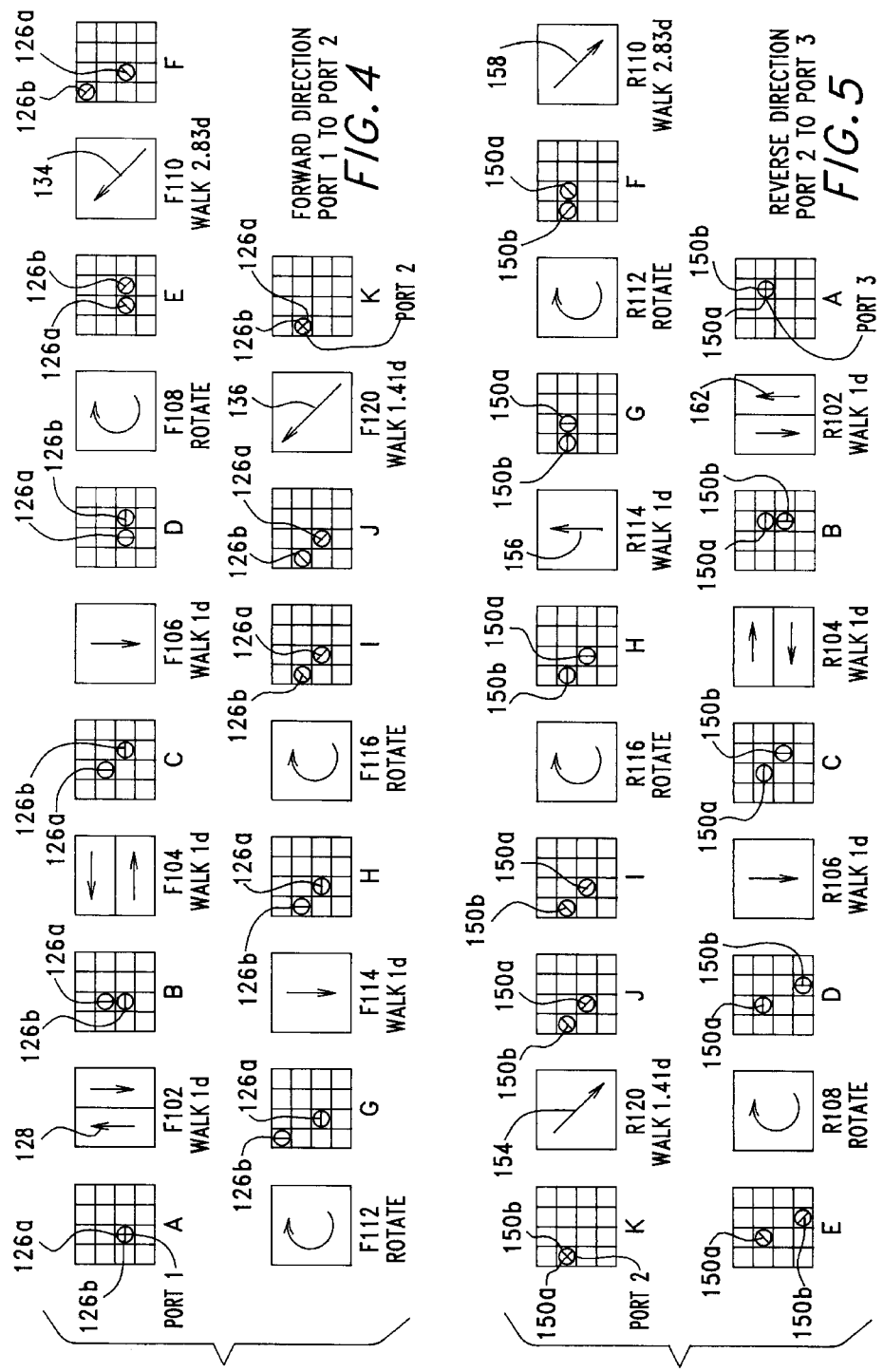

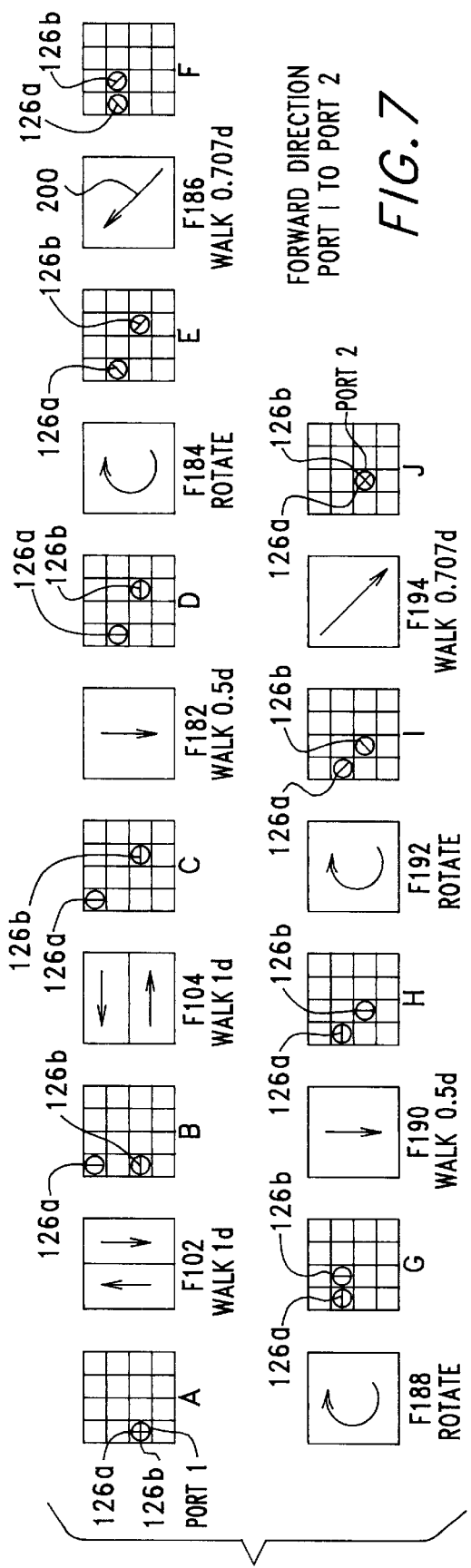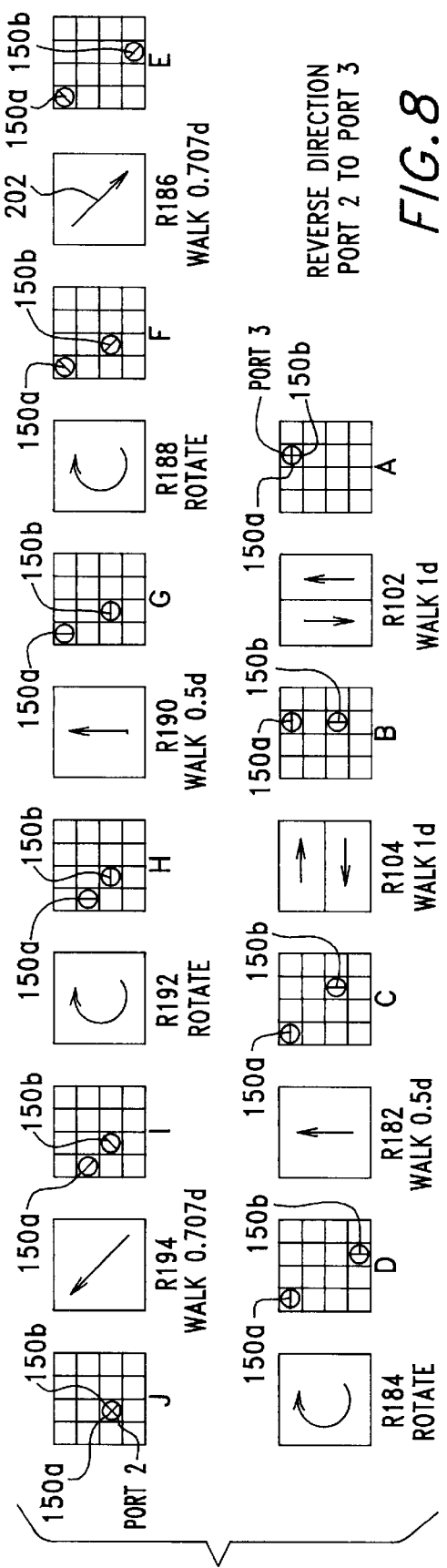

HIGH PERFORMANCE OPTICAL CIRCULATORS

BACKGROUND OF THE INVENTION

The present invention relates generally to optical circulators and, more particularly, to optical circulators including an arrangement configured for performing a predetermined sequence of optical operations including at least three non-reciprocal polarization rotation steps on light signals passing therethrough.

State of the art communications/data transmission systems increasingly rely upon the transfer of information in the form of light signals. These light signals are typically transmitted through fiber optic cables. Consequently, needs have arisen for interfacing with the fiber optic cables and for manipulating the light signals in certain ways outside of the fibers. In order to satisfy both of these needs, various functional types of optical devices have been developed. One class of such optical devices, which forms the basis for other types of devices, is known as optical circulators. During operation, an optical circulator is configured for passing light signals received by one port of a series of ports to the next port in the series. For example, a four port circulator having ports 1 through 4 passes a signal injected into port 1 to port 2, a signal injected into port 2 to port 3 and a signal injected into port 3 to port 4. As a specific example of the utility of optical circulators, three-port optical circulators used at both ends of a fiber optic cable enable bi-directional transmission of data over the fiber optic cable.

One example of a prior art optical circulator is shown in FIG. 1. The latter is a representation of FIG. 2a taken from U.S. Pat. No. 5,574,596 showing an optical circulator generally indicated by the reference numeral 10. Initially, it should be noted that circulator 10 is formed from various layers of crystalline material. The circulator includes an input arrangement 12 and an identical output arrangement 14. A plarization shifting arrangement 16 is positioned between the input and output arrangements and comprises first and second birefringent walk-off crystals 18a and 18b which may be referred to hereinafter as a birefringent crystal pair. During operation, optical circulation is provided between three ports, as indicated by the reference numbers 20a, 20b and 20c, respectively. It should be noted that an interface surface 22 is defined by the birefringent crystal pair.

Still discussing optical circulator 10, input arrangement 12 and output arrangement 14 each include walk-off layers 26 and polarization rotation layers 28a and 28b. With regard to ideal operation of circulator 10, a first signal injected into port 20a should appear in its entirety at port 20b while a second signal injected into port 20b should appear in its entirety at port 20c. Isolation between the first and second signals is compromised, for example, when a portion of the second signal injected into port 20b appears at port 20a, rather than at port 20c. While specific details of the operation of circulator 10 will not be provided herein, at this juncture it is appropriate to mention the recognition by Applicant that signal isolation in circulator 10 is related in a very direct manner to the presence of polarization rotation layers 28a and 28b. Moreover, Applicant further recognizes that the presence of two non-reciprocal polarization rotation layers in the design of circulator 10 provides a significant isolation advantage when compared with designs which incorporate only a single non-reciprocal polarization rotation layer, as will be discussed below with regard to an alternative circulator design and at other appropriate points hereinafter.

While circulator 10 may provide significant levels of isolation performance, at the same time, this circulator also incorporates at least one disadvantage which will be described immediately hereinafter.

Still referring to FIG. 1, it is submitted that a particular disadvantage is associated with circulator 10. Specifically, an unfocused beam of light injected, for example, from an optical fiber into any of ports 20 must initially pass through either input arrangement 12 or output arrangement 14. In either case, the beam will exhibit expansion by the time it reaches the birefringent crystal pair. Further beam expansion will then occur as the beam passes through the birefringent crystal pair. Unfortunately, polarization components of the beam are likely to interact with interface 22 as a result of the beam expansion. The result of this interaction is signal "clipping" wherein a portion of the beam power is undesirably lost. Therefore, it is submitted that any practical implementation of the device shown in FIG. 1 will require external focusing components (not shown) such as, for example, lenses which serve to focus light emitted by fiber optic cables into the circulator body in compensation for beam expansion. However, it should be appreciated that practical implementations of lenses required for this focusing necessitate an undesirably large beam separation. That is, the lateral distance between ports 20a and 20b must be large enough to accommodate the lenses. The beam separation necessitated by the lenses itself establishes the amount of walk-off which must be produced by walk-off elements within the overall assembly with respect to walking beams or components thereof to a common path from two different paths. Therefore, the use of focusing lenses leads to a direct increase in the length of the walk-off elements required. In this regard, it should be appreciated that such an increase in the length of the walk-off elements also increases manufacturing costs since the cost of such elements is a strong function of their volume.

Turning now to FIG. 2, another prior art circulator design is generally indicated by the reference number 40. FIG. 2 is a partial reproduction of FIG. 5B taken from U.S. Pat. No. 5,734,763. Circulator 40 includes a polarization mixing front end 42 which is made up of first and second birefringent crystals 44a and 44b. Front end 42 further includes third and fourth birefringent crystals 46a and 46b. A first interface surface 47a is defined between crystals 44a and 44b while a second interface surface 47b is defined between crystals 46a and 46b. Walk-off directions of the birefringent crystal pairs are oriented in opposing directions as indicated in a conventional manner using "+" and "−" signs wherein the walk-off is towards a + sign and away from a−sign. Front end 42 is in optical communication with a component arrangement 50 that is made up of birefringent crystals 52 and 54, having walk-off directions oriented as indicated, along with a half-wave plate 56 and a non-reciprocal polarization rotation layer 58. During operation of circulator 40, optical circulation is provided between ports 1 through 3 and associated optical fibers 60, 62 and 64, in the conventional manner described above. It is noted that fibers 60 and 64 are thermally expanded core (TEC) fibers while fiber 62 is a single mode fiber. Light signals are not illustrated for purposes of clarity, however, it should be appreciated that light signals are coupled between component arrangement 50 and fiber 62 through a lens 66.

Referring to FIGS. 1 and 2, certain concerns with regard to circulators 10 and 40 will now be discussed. Initially, it is noted once again that interface surface 22 of circulator 10 is centrally located within the device. Thus, a beam (not shown) entering the device will experience spreading in passing through other portions of the device prior to encountering crystals 18a and 18b which define the interface surface. For this reason alone, circulator 10 may demand special design consideration such as, for example, the provision of external focusing lenses in order to avoid clipping the beam. In contrast, circulator 40 (FIG. 2) includes interface surfaces 47a and 47b which are disposed at one end of the device such that a beam (not shown) entering port 1 immediately passes the interface surfaces. In this way, the beam experiences minimal spreading, thereby reducing the need for special design provisions as a result of the beam spreading concern. It should be appreciated that provisions taken in view of beam spreading can, in and by themselves, significantly increase the overall size of the device. However, circulator 40 includes only one non-reciprocal polarization rotation layer (layer 58) which affords isolation between light signals passing from port 1 to port 2 and passing from port 2 to port 3 and light signals directed on these same paths in the reverse direction. In accordance with the teachings of the present invention, as will be described in detail below, it is submitted that the provision of a single polarization rotation layer results in device performance, at least with respect to signal isolation, which is considered to be inadequate over an operating temperature range of as 0° C. to 70° C., as is typically specified for devices of this type. In this regard, it may be suggested that a second polarization layer may merely be incorporated in the design of circulator 40 of FIG. 2 in order to bring its isolation performance into line with the isolation performance of circulator 10 of FIG. 1.

Unfortunately, however, a number of concerns arise when attempting to add additional components to a finalized optical component design. These concerns include, for example: (1) the need for arranging the shifts of differently polarized beam components so as to provide recombination of beams meant to pass through the device while maintaining separation between polarization components of other beams which are not meant to pass through, i.e. beams that are to be "isolated" from returning to a particular location, (2) the need for balancing phase delays experienced by the orthogonal polarization components of each light beam as the beams travel through the device such that the beams are properly "reconstructed" from a temporal dispersion standpoint upon emerging from the device and (3) the need for balancing the manipulations of different beam polarization components so that the propagation parameters to which each beam is subjected to as the beams are transmitted through the device are as similar as possible. However, one of ordinary skill in the art will appreciate that balancing phase shifts, in and by itself, is extremely difficult when attempting to add components to a given design configuration.

The present invention solves the foregoing concerns by providing an optical circulator which incorporates three isolation layers in a compact, highly advantageous configuration so as to provide levels of operational performance, including signal isolation capabilities, that have not been seen heretofore.

SUMMARY OF THE INVENTION

As will be described in more detail hereinafter, there are disclosed herein high performance optical circulators and an associated method. These circulators, like the prior art circulators illustrated in FIGS. 1 and 2, include a main body which is designed to act on first and second light signals passing therethrough and which has (i) a first end defining a first port and a third port, (ii) a second, opposing end defining a second port and (iii) a length between the first and second ends along which the light signals pass. The improvement comprises an arrangement along the length of the main body for performing a predetermined sequence of optical operations including at least three non-reciprocal polarization rotation steps which are separated from one another by other optical operations (a) on the first light signal as the first light signal passes in a forward direction from the first port to the second port and (b) on the second light signal as the second light signal passes in a rearward direction from the second port to the third port such that a substantial portion of the first light signal exits from the second port and a substantial portion of the second light signal exits from the third port and so that the first and third ports are physically isolated with respect to one another at the first end.

In one aspect of the invention, an arrangement is provided which receives a first predetermined spatial arrangement of polarization components of the first light signal and which receives the second light signal to, thereafter, provide a second predetermined spatial arrangement of polarization components of the second light signal. The arrangement is configured for performing a predetermined sequence of alternating walk-off and polarization rotation steps along its length including the aforementioned three non-reciprocal polarization rotations on the first and second light signals.

BRIEF DESCRIPTION OF THE DRAWINGS

The present invention may be understood by reference to the following detailed description taken in conjunction with the drawings briefly described below.

FIG. 3 is a diagrammatic perspective view of a first embodiment of a circulator manufactured in accordance with the present invention which includes three isolation stages within its overall structure.

FIG. 4 is a diagrammatic illustration showing interface surfaces adjoining the ten layers which make up the circulator of FIG. 3 along with orthogonal polarizations of a forward traveling light beam and also showing function diagrams depicting walk-off and rotation functions performed by each layer on the forward traveling light beam.

FIG. 5 is a diagrammatic illustration showing interface surfaces adjoining the ten layers which make up the circulator of FIG. 3 along with orthogonal polarizations of a reverse traveling light beam and also showing function diagrams depicting walk-off and rotation functions performed by each layer on the reverse traveling light beam.

FIG. 6 is a diagrammatic perspective view of a second embodiment of a circulator manufactured in accordance with the present invention which includes three isolation stages within its overall structure.

FIG. 7 is a diagrammatic illustration showing interface surfaces adjoining the nine layers which make up the circulator of FIG. 6 along with orthogonal polarizations of a forward traveling light beam and also showing function diagrams depicting walk-off and rotation functions performed by each layer on the forward traveling light beam.

FIG. 8 is a diagrammatic illustration showing interface surfaces adjoining the nine layers which make up the circulator of FIG. 6 along with orthogonal polarizations of a reverse traveling light beam and also showing function diagrams depicting walk-off and rotation functions performed by each layer on the reverse traveling light beam.

DETAILED DESCRIPTION OF THE INVENTION

Figure 1:
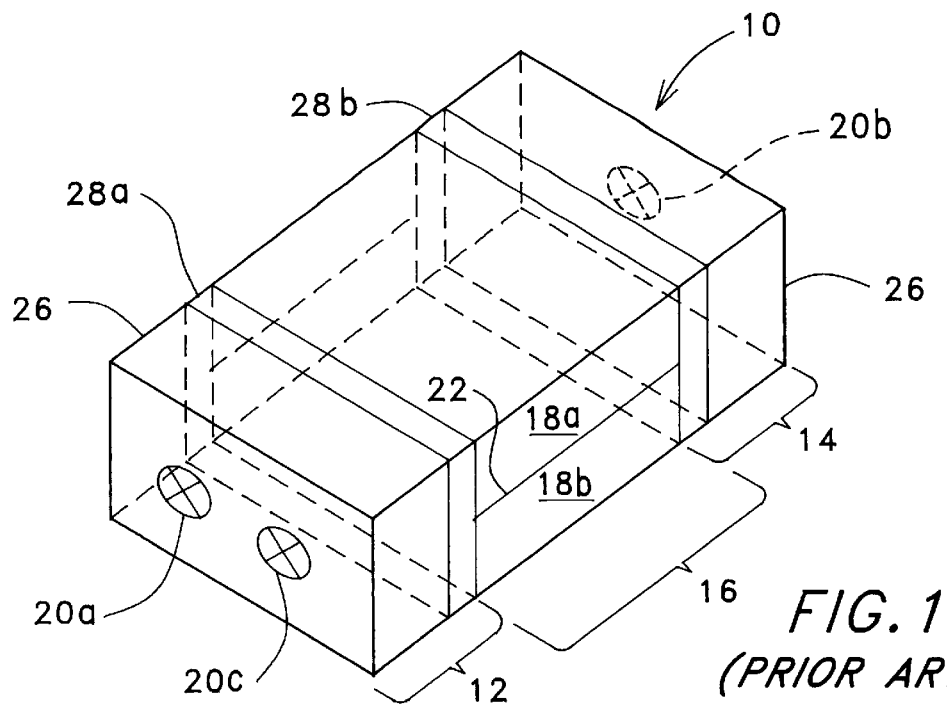
FIG. 1 is a diagrammatic perspective view of a first prior art circulator which is representative of FIG. 2a from U.S. Pat. No. 5,574,596 illustrating the overall structure of the circulator including two isolation layers.
Figure 2:
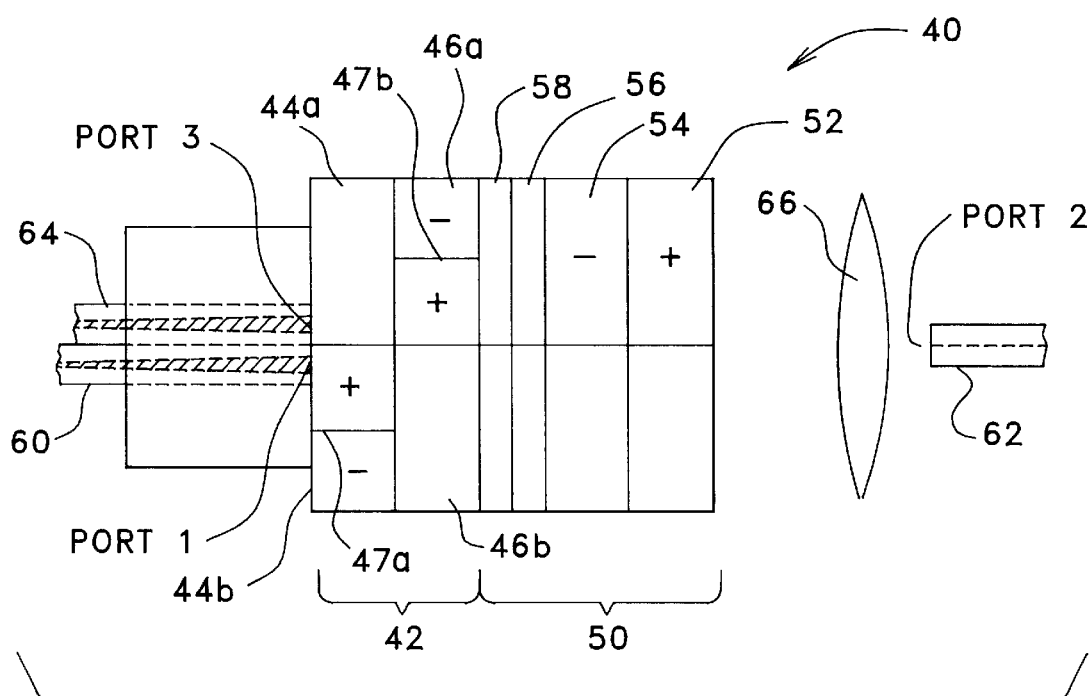
FIG. 2 is a diagrammatic elevational view of a second prior art circulator which is representative of FIG. 5B from U.S. Pat. No. 5,734,763 illustrating the overall structure of the circulator including a single isolation layer.

Having previously described FIGS. 1 and 2, attention is immediately directed to FIG. 3 which illustrates an optical circulator manufactured in accordance with the present invention and generally indicated by the reference numeral 100. Circulator 100 incorporates a series of stacked optical elements in the form of substrates with parallel planar surfaces. Specifically, the circulator is comprised of a series of ten layers indicated by the reference numbers 102, 104, 106, 108, 110, 112, 114, 116, 118 and 120. The visible end surface of the circulator is designated by the letter "A" while the opposite end of the circulator is designated by the letter "K". Intermediate surfaces which lie between surfaces A and K are designated by the letters B through J. Specific details regarding the composition of each layer will be provided an appropriate points hereinafter.

Still referring to FIG. 3, surface A of layer 102 defines port 1 and port 3 of the circulator. Port 2 is defined by surface K of layer 120 at the opposite end of the circulator, however, this latter port is not visible in the present figure. As mentioned previously, a signal injected into port 1 should be passed to port 2 while a signal injected into port 2 should be passed back to port 3. The ten layers which make up the overall circulator include both polarization rotation layers and birefringent layers. The thicknesses of birefringent layers are indicated in the figure in terms of the quantity "X" which is established by the walk-off characteristics of the material which is used to form these layers. A length of bi-refringent material of 1X fabricated so as to provide walk-off will walk off a beam of the correct polarization direction by an amount "d". Ports 1 and 3 are separated by a distance of 1.41d for reasons which will be made apparent hereinafter.

Turning to FIG. 4 in conjunction with FIG. 3, each of surfaces A through K is diagrammatically illustrated including the polarization orientation of orthogonal components of a light beam 126 that is received by port 1 traveling in a forward direction consistent with the direction of the arrow used to denote the light beam. Between each of the depicted surface diagrams, function diagrams F102, F104, F106, F108, F109, F110, F112, F114, F116 and F120 correspond to the reference numbers of the ten device layers and diagrammatically illustrate the functional step performed within the associated layer. No function diagram is associated with layer 118 since this layer comprises a phase delay compensation layer that has no influence upon polarization orientation. Aside from the phase delay compensation layer, it should be appreciated that two basic steps are performed by the layers of circulator 100. Specifically, walk-off steps are performed using birefringent or double refraction crystals. Such crystals include an ordinary axis and an extraordinary axis wherein light polarized along the ordinary axis passes straight through the crystal while light polarized along the extraordinary axis is directed in what is commonly referred to as a walk-off direction. Details regarding production of such crystals with regard to orienting the ordinary and extraordinary axis in desired directions will not be provided herein since techniques for doing so are well known in the art. Materials suitable for use as walk-off layers include, but are not limited to calcite, rutile, or vanadate. As shown on the surface A diagram, beam 126 can be resolved into orthogonal first and second components 126a and 126b, respectively. In this regard, it should be appreciated that both circulator embodiments disclosed herein are polarization independent. Moreover, reference to directions in the various figures such as "horizontal" and "vertical" are utilized for illustrative purposes only and it is to be understood that these devices may operate in any orientation. Walk-off directions are indicated in the function diagrams of FIG. 4 using arrows and always looking in the direction of travel of beam 126. Thus, a polarization orientation which is parallel to the walk-off direction will experience the walk-off. At this point, it is appropriate to note that a walk-off material having a 1X thickness will move the appropriate polarization component either vertically or horizontally by a single position within the matrix of illustrated positions in each of the surface diagrams of FIG. 4. Thus, the grid size of FIG. 4 is equal to d. The thicknesses or type of material for each of the layers may vary in accordance so long as the requisite functionality of the layer is maintained.

Still referring to FIGS. 3 and 4, layer 102 is made up of a first birefringent crystal pair that includes crystals 102a and 102b while layer 104 is made up of a second birefringent crystal pair that includes crystals 104a and 104b. Walk-off directions are indicated by function diagrams F102 and F104, respectively. As beam 126 passes through crystal 102b, first component 126a is walked upward by 1d in the direction indicated by an arrow 128 prior to arrival at surface B while second polarization component 126b does not experience walk-off. At surface B, first polarization component 126a enters crystal 104a while second polarization component 126b enters crystal 104b. As the polarization components pass through crystals 104a and 104b, second polarization component 126b is walked horizontally to the right by 1d (F104) prior to arrival at surface C while first polarization component 126a does not experience walk-off. From surface C, the polarization components next enter birefringent layer 106. In this layer, according to function diagram F106, first component 126a is walked downward by 1d before arrival at surface D such that the two polarization components are side by side and are separated by 1d at surface D.

In accordance with the present invention, the beam components enter first non-reciprocal polarization rotation or Faraday layer 108 such that both polarizations experience a first polarization rotation of 45° in a clockwise direction as shown by F108. Materials which are suitable for use herein as polarization rotation layers include, but are not limited to bismuth substituted yttrium-iron garnet, or gadolinium-gallium garnet. Further details with regard to particular characteristics of Faraday layers used herein will be provided at an appropriate point below. Thereafter, the polarization components enter layer 10 at surface E. This layer comprises a walk-off layer which moves second component 126b in the direction indicated by an arrow 134 in F110 such that the second component moves horizontally to the left 2d and vertically upward by 2d for an overall movement of approximately 2.83d before arriving at surface F. The polarization components then enter second rotation/Faraday layer 112 so as to undergo a second 45° rotation in the clockwise direction indicated in F112 and resulting in the polarization orientations exemplified by the surface G diagram of FIG. 4 to place first component 126a into a horizontal orientation and second component 126b into a vertical orientation. In layer 114, a walk-off moves second component 126b down by 1d (F114) prior to arrival at surface H. A third polarization rotation is experienced by the polarization components as they pass through layer 116. Specifically, as shown by F116, both polarization components are rotated approximately 45° in a clockwise direction as shown prior to reaching surface I.

Still referring to FIGS. 3 and 4, as mentioned, layer 118 comprises a phase delay compensation layer which is used to balance phase differences between orthogonal polarization components which experience differing amounts of walk-off and does not change the polarization orientations or positions of the components reaching surface J. The phase delay compensation layer may be formed, for example, using rutile. Thereafter, layer 120 comprises a walk-off layer which moves second component 126b diagonally by 1.41d such that the first and second components overlap on surface K at port 2 completing the travel of beam 126 from port 1 to port 2 in the desired manner.

Having described the travel of beam 126 in the forward direction, travel of a light beam 140 will now be described in the reverse direction with reference to FIGS. 3 and 5. Like FIG. 4, FIG. 5 includes function diagrams for purposes of illustrating the effects of each layer on specific light polarizations. However, the function diagrams are designated in this instance by the letter "R" followed by the reference number of the associated layer wherein R indicates travel in the reverse direction in accordance with beam 140. The reader is reminded that all illustrations in FIG. 5 assume the same viewpoint as those of FIG. 4. That is, looking in the forward direction. After entering walk-off layer 120 at port 2, as defined on surface K, beam 140 is separated into first and second orthogonal polarization components 150a and 150b, respectively, as a result of first component 150a experiencing a 1.41d walk-off as indicated by an arrow 154 in function diagram R120. Thereafter, the polarization components pass through phase delay compensation layer 118 in which the polarization orientations of the components are not changed upon reaching surface I, as mentioned above, with regard to forward traveling beam 126. The reverse traveling polarization components then experience a first polarization rotation as they pass through layer 116. Specifically, as shown by function diagram R116, both polarization components are rotated approximately 45° in a clockwise direction prior to reaching surface H. Next, in layer 114, a walk-off indicated an arrow 156 moves first polarization component 150a up by 1d (R114) prior to its arrival at surface G. The polarization components then enter polarization rotation/Faraday layer 112 so as to undergo a second 45° rotation in the clockwise direction indicated in R112, resulting in the polarization orientations exemplified in surface diagram F of FIG. 5 so as to place polarization components 150a and 150b into the depicted orientations. Thereafter, the polarization components enter walk-off layer 110 at surface F. This layer moves second component 150b in the direction indicated by an arrow 158 in R110 such that the second component moves horizontally to the right 2d and vertically downward by 2d for an overall movement of approximately 2.83d prior to arriving at surface E. The beam components then enter Faraday layer 108 such that polarization components 150a and 150b experience a third polarization rotation of 45° in a clockwise direction as shown by R108.

Still referring to FIGS. 3 and 5, polarization components 150a and 150b enter birefringent layer 106 at surface D. In this layer, according to function diagram R106, first component 150b is walked upward 1d prior to arrival at surface C such that the two polarization components are diagonally adjacent one another separated by 1.41d. From surface C, first polarization component 150a enters crystal 104a while second polarization component 150b enters crystal 104b. As the polarization components pass through crystals 104a and 104b, first polarization component 150a is walked horizontally to the right by 1d (R104) prior to arrival at surface B while second polarization component 150b does not experience walk-off. Polarization components 150a and 150b then enter crystal 102a whereupon the two components are overlapped when they reach port 3 at surface A since polarization component 150b is walked upward by 1d as indicated by an arrow 162. Thus, beam 140 passes from port 2 to port 3 as desired.

Having described the structure and operation of circulator 100, its advantages will now be discussed. As mentioned previously, the provision of two Faraday layers is particularly advantageous when compared with the use of a single Faraday layer since additional isolation is available. For example, in terms of isolation performance, for a single Faraday layer, the amount of unwanted power which reaches a port is determined by the sine squared of the angular error of that light polarization component which transmits down an incorrect path. Under the assumptions of: (1) the ability to specify the rotation characteristics of a Faraday material with an accuracy of one degree of polarization rotation, (2) a polarization rotation temperature sensitivity of the Faraday material of 0.05 degrees/° C. and (3) and a wavelength sensitivity of the Faraday material of 0.06 degrees of rotation per nm, a range of operating temperatures can be determined. If a 40 nm range is employed, this wavelength range translates to +/−20 nm from a specified center wavelength. Therefore, a wavelength band variation in polarization rotation from the center of the wavelength band to each edge is equal to 20 nm×0.06 degrees of rotation per nm or 1.2 degrees difference in polarization rotation at the edges of the band from the value at the center of the band. For a desired level of isoation of −50 dB or a power ratio of 0.00001 to 1, the total angular error in rotation of polarization, θ, can be calculated as:

$$\theta = \sin^{-1}\left[\sqrt[2n]{PR}\right] \qquad (1)$$

where PR is the power ratio and n is the number of isolation (i.e., Faraday) layers.

Thus, for a desired isolation performance of −50 dB, corresponding to a power ratio of 0.00001 to 1 and with n equal to 1 for one isolation layer, θ is approximately equal to 0.18 degrees in total polarization rotation error. However, this total angular error is seen to be far less than the wavelength band variation of 1.2 degrees from the center to the edge of a 40 nm wavelength band or the 1 degree manufacturing tolerance. In fact, for a practical device, the sum of the wavelength band variation and the manufacturing tolerance must be somewhat less than the total error in polarization rotation from equation 1. For this reason, it is submitted that it is impractical to produce a circulator which exhibits −50 dB performance in accordance with the values given above using a single isolation layer. That is, the isolation performance must be lowered to approximately 22 dB before a practical single isolation layer device can be produced. However, such performance falls below current industry expectations.

Still considering equation 1 and the Faraday material parameters set forth immediately above, for a two layer device (n=2) having −50 dB performance, equation 1 yields a total angular polarization rotation error of approximately 3.22 degrees. Subtracting 1.2 degrees for wavelength band variation and 1 degree for manufacturing tolerance leaves 1.02 degrees of temperature caused polarization rotation error for −50 dB isolation performance. Therefore, the polarization rotation at either end of the wavelength band may vary by 1.02 degrees as a result of temperature change. Dividing 1.02 by 0.05 degrees/° C. gives the corresponding temperature change of approximately 20.4° C. on either side of the nominal operational point or a total temperature operating window of 40° C. for −50 dB isolation performance. This temperature window is considered as being too narrow for most practical applications.

Now considering the three isolation layer circulator of the present invention in view of equation 1 and the values specified above for the Faraday material, for −50 dB performance with n=3, the total angular polarization rotation error from equation 1 is equal to 13.72 degrees. Subtracting 1.2 degrees for wavelength band variation and 1 degree for manufacturing tolerance leaves 11.52 degrees of temperature caused polarization rotation error for −50 dB isolation performance. Dividing 11.52 by 0.05 degrees/° C. yields a temperature shift of approximately 230.4° C. to either side of the nominal operational point or a total temperature operating window of 460.8° C. This temperature window is considered to be a remarkable improvement over the practical temperature range capabilities of prior art devices for −50 dB isolation performance. In this regard, it should be appreciated that typical prior art devices necessarily specify a much lower level of isolation performance in order to achieve a reasonably broad operating temperature window, as will be described in more detail immediately hereinafter.

It is now appropriate to mention that the benefits of the present invention have been described immediately above in terms of a specified level of isolation performance which then yields a particular operational temperature window. While −50 dB isolation performance is readily accomplished in accordance with the present invention, even higher levels of isolation perforrmnance can be achieved by narrowing the operational temperature window. For example, in the prior art, an acceptable operational temperature window was considered to be approximately 80° C. wide. Using the values above, it can be seen using equation 1 that for this prior art operational temperature window and a 40 nm bandwidth, the present invention achieves an isolation performance of −75 dB. In contrast, in the prior art, an isolation level of only approximately −40 dB was typically specified. It should also be appreciated that the benefits of the present invention may also be viewed in terms of providing a wider operating wavelength range. Moreover, specific designs may provide a combination of benefits in terms of operating wavelength range, operating temperature window and isolation performance. It is to be understood that any combination of these benefits is considered to be within the scope of the present invention so long as the teachings herein are applied.

Attention is now directed to FIG. 6 which illustrates a preferred embodiment of the circulator of the present invention generally indicated by the reference numeral 180. It is noted that like reference numbers will be used to refer to like components wherever possible throughout the various figures. Like circulator 100, circulator 180 incorporates a series of stacked optical elements in the form of substrates with parallel planar surfaces. Specifically, the circulator is comprised of a series of nine layers indicated by the reference numbers 102, 104, 182, 184, 186, 188, 190, 192 and 194. It is noted that layers 102 and 104 are essentially identical to the corresponding layers of FIG. 4. The visible end surface of the circulator is designated by the letter "A" while the opposite end of the circulator is designated by the letter "J". Intermediate surfaces which lie between surfaces A and J are designated by the letters B through I.

Referring to FIG. 7 in conjunction with FIG. 6, surface A of layer 102 defines port 1 and port 3 of circulator 180. Port 2 is defined by surface J of layer 194 at the opposite end of the circulator, however, this latter port is not visible in the present figure. Surfaces A through J are diagrammatically illustrated in FIG. 7 including the polarization orientation of orthogonal components of beam 126 at each surface as the beam travels from port 1 in a forward direction consistent with the direction of the arrow used to denote light beam 140. Between each of the depicted surfaces, function diagrams F102, F104, F182, F184, F186, F188, F190, F192 and F194 (corresponding to the reference numbers of the ten device layers) diagrammatically illustrate the functional step performed within the associated layer. That is, either a walk-off or a polarization rotation. Again, walk-off directions are indicated in the function diagrams of FIG. 6 using arrows and always looking in the forward direction of travel of beam 126 such that a polarization orientation which is parallel to the walk-off direction will experience the walk-off. At this point, it is appropriate to note that the grid spacing in the function diagrams of FIG. 7 has been reduced to one-half the spacing used in the function diagrams of FIGS. 4 and 5, while the dimension "X" remains unchanged. Thus, in the function diagrams of FIG. 6, a walk-off material having a 1X thickness will move the appropriate polarization component either vertically or horizontally by two positions within the grid of illustrated positions. Thus, the grid size in FIG. 6 is 0.5(d) The thicknesses of the layers may vary in accordance with the materials used so long as functionally equivalent operations are performed by each layer.

As beam 126 travels through first crystal 102b of layer 102, the beam is resolved into first and second components 126a and 126b enroute to surface B by walking first component 126a upward vertically by 1d (i.e., two grid positions). At surface B, first polarization component 126a enters crystal 104a while second polarization component 126b enters crystal 104b. As the polarization components pass through crystals 104a and 104b, second polarization component 126b is walked horizontally to the right by 1d or two grid positions (F104) prior to arrival at surface B. First polarization component 126a does not experience walk-off in crystal 104a since its polarization orientation is orthogonal to the crystal's walk-off direction. The polarization components then arrive at surface C whereupon birefringent layer 182 is entered. In this layer, according to function diagram F182, first component 126a is walked downward by 0.5d (i.e., one grid position) before arrival at surface D.

With continuing reference to FIGS. 6 and 7, the beam components enter a first non-reciprocal polarization rotation or Faraday layer 184 such that both polarizations experience a first polarization rotation of 45° in a clockwise direction as shown by F184. Thereafter, the polarization components enter layer 186 at surface E. This layer comprises a walk-off layer which moves second component 126b in the direction indicated by an arrow 200 in F186 such that the second component moves diagonally by 0.707d such that components 126a and 126b are immediately adjacent to one another before arriving at surface F. The polarization components then enter a second rotation/Faraday layer 188 so as to undergo a second 45° rotation in the clockwise direction indicated in F188 to place first component 126a into a horizontal orientation and second component 126b into a vertical orientation. In layer 190, a walk-off moves second component 126b down by 0.5d (F190) prior to arrival at surface H. A third polarization rotation is experienced by the polarization components as they pass through layer 192 to place the components in the depicted orientations. Specifically, as shown by F192, both polarization components are rotated approximately 45° in a clockwise direction as shown upon reaching surface I. Thereafter, walk-off layer 194 moves first component 126a diagonally as shown in F194 by 0.707d such that the first and second components overlap on surface J at port 2 completing the travel of beam 126 from port 1 to port 2.

Turning now to FIGS. 6 and 8 travel of beam 140 will be described in a reverse direction through circulator 180. Consistent with previous figures, FIG. 8 depicts surfaces J-A looking in the forward direction along with function diagrams denoted by "R" immediately preceding the associated layer number. Beam 140 can be resolved into first and second orthogonal polarization components 150a and 150b upon entering port 2 at surface J. To that end, walk-off layer 194 moves first component 150a diagonally as shown in R194 by 0.707d. A 45° polarization rotation is produced in a clockwise direction (R192) as polarization components 150a and 150b pass through layer 192 to place the component 150a into a vertical orientation and component 150b into a horizontal orientation. From surface H, in layer 190, a walk-off moves first component 150a up by 0.5d (F190) prior to arrival at surface G. The polarization components then enter rotation/Faraday layer 188 so as to undergo a second 45° rotation in the clockwise direction indicated in R188 to place the components into the depicted orientations at surface F. Thereafter, the polarization components enter layer 186. This layer comprises a walk-off layer which moves second component 150b in the direction indicated by an arrow 202 in R186 such that the second component moves diagonally by 0.707d before arriving at surface E. The beam components then enter a polarization rotation/Faraday layer 184 such that both polarizations experience a polarization rotation of 45° in a clockwise direction as shown by R184 which places component 150a into a horizontal orientation and component 150b into a vertical orientation. In layer 182, according to function diagram R182, second component 150b is walked upward by 0.5d (i.e., one grid position) before arrival at surface C. From surface C, first polarization component 150a enters crystal 104a while second polarization component 150b enters crystal 104b. As the polarization components pass through crystals 104a and 104b, first polarization component 150a is walked horizontally to the right by 1d or two grid positions (R104) prior to arrival at surface B so as to be located 1d above component 150b. At surface B, both polarization components then enter crystal 102a of layer 102 whereupon component 150b is walked upward by 1d as it passes through the layer so as to overlap component 150a in a proper orthogonal orientation at port 3.

It should be appreciated that circulator 180 of FIG. 6 provides all of the benefits described above with regard to circulator 100 of FIG. 7 including enhanced isolation performance of at least a factor of ten greater than that typical of the prior art. However, it should be appreciated that circulator 180 provides still further benefits. Specifically, in one further benefit, circulator 180 does not require the provision of a phase compensation layer. This benefit is attributable to the overall structure of the layers as set forth in FIG. 6. That is, the walk-offs experienced by each orthogonal polarization of both forward and reverse traveling light beams which pass through the circulator are exactly balanced such that each polarization encounters essentially identical amounts of walk-offs. The elegance of this design eliminates the need for a phase compensation layer since the latter is utilized in the instance where walk-offs are not balanced. As can clearly be seen in FIG. 6, circulator 180 also enjoys the additional benefit of being remarkably compact. This latter benefit is at least in part attributable to the elimination of the need for a phase compensation layer. However, it should be appreciated that birefringent layers 182 and 190 have thicknesses of only 0.5X while birefringent layers 186 and 194 have thicknesses of only 0.707X. Thus, the relative thinness of these layers contributes to the overall compactness of the device. In this regard, the provision of such thin layers serves to reduce material costs in manufacturing. Moreover, the efficient combination of walk-off and rotations disclosed herein have not been seen heretofore by Applicant and are considered to be highly efficient and advantageous.

In the instance of either embodiment of the present invention, it is submitted that a highly compact optical isolator which exhibits the isolation performance capabilities disclosed herein has not been seen heretofore. With further regard to the overall compactness of circulators 100 and 180 it is important to note that the rightmost column of grid positions in all surface diagrams are never used throughout the operation of both circulators. These unused positions were illustrated for purposes of maintaining symmetry throughout the figures in order to enhance the reader's understanding upon an initial reading. However, it is to be understood that this unused column of positions may be eliminated so as to still further reduce the size of the overall devices disclosed herein. Moreover, it should be appreciated that the surface and function diagrams of FIGS. 4, 5, 7 and 8 are schematic in nature and are not representative of actual device dimensions. Additionally, layer thicknesses have been greatly exaggerated for illustrative purposes. As an example, with regard to walk-off layers using rutile, a value for X of less than 1 mm is typical for d having a value of approximately 90 microns. Thus, the circulators disclosed herein are remarkably compact.

Since the optical circulators and associated method disclosed herein may be provided in a variety of different configurations and the method may be practiced in a variety of different ways, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. In an optical circulator including a main body which is designed to act on first and second light signals passing therethrough and which has (i) a first end defining a first port and a third port, (ii) a second, opposing end defining a second port and (iii) a length between said first and second ends along which said light signals pass, the improvement comprising:

an arrangement along said length of said main body for performing a predetermined sequence of optical operations including at least three non-reciprocal polarization rotation steps which are separated from one another by at least one optical walk-off step (a) on said first light signal as the first light signal passes in a forward direction from said first port to said second port and (b) on said second light signal as the second light signal passes in a rearward direction from said second port to said third port such that a substantial portion of said first light signal exits from said second port and a substantial portion of said second light signal exits from said third port and wherein the first end of said main body includes two birefringent crystals adjacent one another to form an abutting interface, each crystal having an optic axis direction different than that of the other, wherein said interface lies parallel to the optical axis of the main body and one of said two birefringent crystals includes a surface which defines said first port and the other of said two birefringent crystals includes a surface which defines said third port so that said first and third ports are physically isolated with respect to one another at said first end.

2. The improvement according to claim 1 wherein said arrangement includes first, second and third layers of a Faraday material for performing said three non-reciprocal polarization rotations.

3. The improvement according to claim 2 wherein said first and second layers of Faraday material are separated from one another using a first layer of a walk-off material and said second and third layers of said Faraday material are separated from one another using a second layer of said walk-off material.

4. The improvement according to claim 3 wherein said arrangement includes a third layer of said walk-off material immediately adjacent said first layer of Faraday material opposite said first layer of said walk-off material and a fourth layer of said walk-off material immediately adjacent said third layer of said Faraday material opposite said second layer of said walk-off material, said fourth layer of walk-off material including a surface which defines said second port.

5. The improvement according to claim 1 wherein the isolation between said first and second light signals provided by said at least three non-reciprocal polarization rotation steps is at least −50 dB when said first and second light signals include a wavelength of approximately 100 nm and at a temperature of approximately 100° C.

6. An optical circulator for acting upon at least first and second light signals and for defining a first light path in a forward direction for said first light signal from a first port to a second port and defining a second light path in a reverse direction for said second light signal from said second port to a third port, said circulator comprising:

a) a main body having a first end defining a first port and a third port, a second, opposing end defining a second port, and a length between said first and second ends; and b) an arrangement along said length of said main body for performing a predetermined sequence of alternating walk-off and polarization rotation steps along said length including at least three non-reciprocal polarization rotations on said first and second light signals such that a substantial portion of said first light signal exits from said second port and a substantial portion of said second light signal exits from said third port and wherein the first end of said main body includes two birefringent crystals adjacent one another to form an abutting interface, each crystal having an optic axis direction different than that of the other, wherein said interface lies parallel to the optical axis of the main body and one of said two birefringent crystals includes a surface which defines said first port and the other of said two birefringent crystals includes a surface which defines said third port so that said first and third ports are physically isolated with respect to one another at said first end.

7. The circulator according to claim 6 wherein said arrangement includes first, second and third layers of a Faraday material for performing the three non-reciprocal polarization rotations.

8. The circulator according to claim 7 wherein said first and second layers of Faraday material are separated from one another using a first layer of a walk-off material and said second and third layers of said Faraday material are separated from one another using a second layer of said walk-off material.

9. The circulator according to claim 8 wherein said arrangement includes a third layer of said walk-off material immediately adjacent said first layer of Faraday material opposite said first layer of said walk-off material and a fourth layer of said walk-off material immediately adjacent said third layer of said Faraday material opposite said second layer of said walk-off material, said fourth layer of walk-off material including a surface which defines said second port.

10. In an optical circulator including a main body which is designed to act on first and second light signals passing therethrough and which has (i) a first end defining a first port and a third port, (ii) a second, opposing end defining a second port and (iii) a length between said first and second ends, the improvement comprising the steps of:

performing a predetermined sequence of optical operations along said length including at least three non-reciprocal polarization rotations which are separated from one another by at least one optical walk-off step (a) on said first light signal as the first light signal passes in a forward direction from said first port to said second port and (b) on said second light signal as the second light signal passes in a reverse direction from the second port to said third port such that a substantial portion of said first light signal exits from said second port and a substantial portion of said second light signal exits from said third port and providing the first end of said main body with two birefringent crystals adjacent one another to form an abutting interface, each crystal having an optic axis direction different than that of the other, wherein said interface lies parallel to the optical axis of the main body and one of said two birefringent crystals includes a surface which defines said first port and the other of said two birefringent crystals includes a surface which defines said third port so that said first and third ports are physically isolated with respect to one another at said first end.

11. The improvement according to claim 10 wherein the isolation between said first and second light signals provided by said three non-reciprocal polarization rotations is at least −50 dB when said first and second light signals include a wavelength range of approximately 100 nm and at a temperature range of approximately 100° C.

* * * * *